United States Patent
Felisa et al.

(10) Patent No.: US 10,566,884 B2
(45) Date of Patent: Feb. 18, 2020

(54) METHODS FOR PRODUCING CORES FOR ELECTRICAL MACHINES

(71) Applicant: Trancerie Emiliane S.P.A., Parma (IT)

(72) Inventors: Franco Felisa, Parma (IT); Orazio Bovaia, Parma (IT)

(73) Assignee: Trancerie Emiliane S.P.A., Parma (IT)

( * ) Notice: Subject to any disclaimer, the term of this patent is extended or adjusted under 35 U.S.C. 154(b) by 1230 days.

(21) Appl. No.: 14/078,630

(22) Filed: Nov. 13, 2013

(65) Prior Publication Data

US 2014/0132107 A1    May 15, 2014

(30) Foreign Application Priority Data

Nov. 15, 2012 (GB) .................................. 1220611.6

(51) Int. Cl.
  *H02K 15/02* (2006.01)
  *H02K 1/16* (2006.01)
  *H02K 1/26* (2006.01)

(52) U.S. Cl.
  CPC ............ *H02K 15/026* (2013.01); *H02K 1/16* (2013.01); *H02K 1/26* (2013.01); *Y10T 29/49009* (2015.01); *Y10T 29/53143* (2015.01)

(58) Field of Classification Search
  CPC .......... H02K 15/026; B21D 39/20–206; B21C 47/30
  See application file for complete search history.

(56) References Cited

U.S. PATENT DOCUMENTS

| 4,507,947 | A | * | 4/1985 | Stanley | .................. | B21D 28/22 |
|           |   |   |        |         |                    | 242/172    |
| 5,896,648 | A | * | 4/1999 | Brown, Jr. | ........... | H02K 15/024 |
|           |   |   |        |         |                    | 29/596     |
| 6,246,142 | B1 | * | 6/2001 | Asao | ........................ | H02K 1/16 |
|           |   |   |        |         |                    | 29/596     |

(Continued)

FOREIGN PATENT DOCUMENTS

| CN | 1438753 | 8/2003 |
| CN | 1906827 | 1/2007 |

(Continued)

OTHER PUBLICATIONS

Intellectual Property Office, "Search Report", "from GB Application No. 1220611.6", dated Feb. 28, 2013, pp. 1-3, Published in: GB.

(Continued)

*Primary Examiner* — Livius R. Cazan
(74) *Attorney, Agent, or Firm* — Fogg & Powers LLC

(57) ABSTRACT

There is described a method and apparatus for forming a core for an electrical machine, in which a stamped metal strip (4a, 4b) is wound onto a mandrel (22), to form a helical winding. The diameter of the mandrel is then increased to apply tension to the wound strip, while the coils of the wound strip are held between clamps (24, 25). The coils of the wound strip are then fixed relative one to another (50, 51), while the coil is held at the increased diameter. The diameter of the mandrel is then reduced to disengage the laminated core from the mandrel. To produce a rotor or stator for an electrical machine, electrical coils are mounted in slots formed in the inner or outer surface of the core. The rotor or stator may then be incorporated into an electrical machine such as a motor or generator.

13 Claims, 8 Drawing Sheets

(56) References Cited

U.S. PATENT DOCUMENTS

| | | | |
|---|---|---|---|
| 2001/0030484 A1 | | 10/2001 | Nakamura |
| 2004/0010907 A1 | * | 1/2004 | Vohlgemuth ........... B21D 28/22 29/596 |
| 2005/0073211 A1 | | 4/2005 | Lee |

FOREIGN PATENT DOCUMENTS

| | | | | |
|---|---|---|---|---|
| CN | 101142854 | | 3/2008 | |
| FR | 2109301 | A5 * | 5/1972 | ........... H02K 15/026 |
| GB | 2349749 | | 8/2000 | |
| JP | 06292347 | A * | 10/1994 | |
| JP | 2006254637 | | 9/2006 | |
| JP | 2006254637 | A * | 9/2006 | |
| JP | 5040441 | | 12/2008 | |
| JP | 2011205836 | A | 10/2011 | |
| SU | 1459580 | | 9/1990 | |
| SU | 1617542 | | 12/1990 | |
| SU | 1647778 | | 5/1991 | |

OTHER PUBLICATIONS

European Patent Office, "Extended European Patent Search Report, from EP Application 13250082.8; dated Aug. 5, 2016", "from Foreign Counterpart of U.S. Appl. No. 14/078,630", Aug. 5, 2016, pp. 1-12, Published in: EP.

European Patent Office, "Summons to Attend Oral Proceedings for EP Application No. 13250082.8 dated Dec. 15, 2017", "Foreign Counterpart to U.S. Appl. No. 14/078,630", filed Dec. 15, 2017, pp. 1-12, Published in: EP.

The State Intellectual Property Office of China, "Office Action from CN Application No. 201380067989.1; dated May 3, 2017", "from Foreign Counterpart of GB Application No. 1220611.6", May 3, 2017, pp. 1-16.

International Searching Authority, "International Search Report and the Written Opinion from PCT Application No. PCT/IS2013/002647; dated May 4, 2015", "from Foreign Counterpart of GB Application No. 1220611.6", May 4, 2015, pp. 1-7.

* cited by examiner

METHODS FOR PRODUCING CORES FOR ELECTRICAL MACHINES

BACKGROUND

Electrical machines such as motors, generators, alternators or the like typically consist of a rotor and a stator surrounding the rotor and coaxial therewith. The rotor and stator each generally comprise a core, around which electrical wires are wound to form the magnetic coils of the device. Generally, the rotor core comprises a cylindrical metallic component having external longitudinal grooves into which the winding wires may be laid. The annular stator core has longitudinal grooves on its inside surface, into which the stator windings are laid.

Laminated cores for electrical machines have been produced by stamping core parts from sheet metal, and then assembling the stamped parts in a stack to form electric motor cores.

In this process, a sheet or strip of metal is stamped to form annular parts for stator cores, and disc-like parts for rotor cores. The stamping process produces large amounts of scrap, and a first attempt to mitigate the production of scrap was made by first stamping the disc-like parts for the rotor core from the sheet material, and then stamping the annular shaped parts which form the stator core from the area of the sheet material surrounding the opening formed by the removal of the rotor core part. A consequence of this technique to reduce scrap, however, is that the rotor and the stator cores are formed from the same metal sheet or strip, and thus must have the same magnetic properties.

To permit the rotor core and the stator core to have different magnetic material properties, techniques have been developed to produce rotor and stator cores separately. The disc-like rotor cores are stamped from metal sheet or strip as before. In order to reduce the amount of scrap generated when producing the annular cores for the stators, production methods for annular cores have been developed in which a strip of metal formed with a castellated edge is wound in a helix to form an annular laminated core.

Examples of this method can be found in, for example, U.S. Pat. No. 4,395,815 which describes forming a laminated stator core by stamping openings in one edge of a metal strip, forming the metal strip into a helical form with the openings on the radially inner edge of each coil, and securing the helical windings of the coiled strip together using longitudinally-extending bolts passing through the laminations of the core adjacent its outer edge.

In order to form the stamped strip into an annular stator core, the current conventional technique is to wind the strip onto a generally cylindrical winding mandrel to form the laminated core, and then grip the wound core and transfer it to a sizing mandrel of a slightly larger diameter than the winding mandrel. The use of a sizing mandrel is necessary because, during winding of the strip, irregularities in the thickness or material properties of the strip can result in the slots or openings formed in the edge of the strip becoming slightly misaligned in the wound coil. The transfer is effected by gripping the wound core and pulling it axially from the winding mandrel, and then placing the core axially onto the sizing mandrel. The sizing mandrel typically has a tapered leading end to assist in inserting the sizing mandrel within the coil.

The sizing mandrel conventionally has longitudinally-extending ridges on its outer surface to engage with the openings on the inner surface of the wound core, to ensure accurate alignment of adjacent coils of the core. The sizing mandrel, due to its slightly larger diameter, applies a tensile strain to the windings of the coil as the coil is placed on the mandrel, slightly stretching the strip material of each coil while the ridges cooperate with the openings in each coil of the strip to ensure accurate alignment.

It will be appreciated that significant amounts of energy are stored within the wound coils of the core, and even for small-diameter cores the equipment required to grip and hold the wound strip during the transfer to the sizing mandrel is considerable. Likewise, significant force is required to place the wound coil onto the sizing mandrel, due to the stretching of the coils during this operation.

The coils of the winding are then fixed together to form the laminated core, preferably by welding at the outer edges of the core. The finished laminated core is then removed from the sizing mandrel, an operation which again requires significant force due to the tight fit between the now-finished core and the sizing mandrel.

A person of ordinary skill in the art will readily appreciate that the conventional process described above can be used only to produce stator cores which have axially-extending internal grooves to receive the motor windings.

SUMMARY

A first aspect of the invention provides a method for manufacturing a laminated core for an electric machine, comprising the steps of: winding a shaped strip onto a mandrel to form a helical winding wherein the plane of the strip is substantially perpendicular to the axis of the helical winding; increasing the diameter of the mandrel by a first predetermined amount, while the mandrel is inside the winding, to impose a tensile strain on the coils of the helical winding; securing each turn of the strained helical winding relative to its adjacent turn or turns to form the laminated core; reducing the diameter of the mandrel by a second predetermined amount greater than the first predetermined amount to relax the laminated core; and removing the laminated core from the mandrel.

In the described embodiment, the turns of the helical winding are secured relative one to another by weld lines extending longitudinally along the outer surface of the core. In the embodiment, three weld lines are applied extending along the entire length of the core. It is however foreseen that more or fewer weld lines may be applied, and that the weld lines may extend in straight lines parallel to the axis of the winding, or may extend along helical or other paths. Some or all of the weld lines may not extend along the entire axial length of the laminated core. The essential feature is that each turn of the helical winding is secured relative to its neighbours, resulting in a unitary laminated core structure.

A second aspect of the invention provides an apparatus for manufacturing laminated cores for electrical machines, the apparatus comprising: a cylindrical mandrel of adjustable diameter; adjusting means for adjusting the diameter of the mandrel between a first, intermediate, diameter, a second diameter larger than the first diameter, and a third diameter smaller than the first diameter; winding means for winding a shaped strip onto the mandrel, with the plane of the strip substantially perpendicular to the mandrel axis, to form a core winding; clamping means for clamping the core winding onto the mandrel; fixing means for fixing together the coils of the core winding to form a laminated core; discharge means for removing the laminated core from the mandrel; and control means for controlling the operation of the adjusting means, the winding means, the clamping means, the fixing means and the discharge means.

In the preferred embodiment, the control means is operable to control the winding and adjusting means such that in a first phase the winding means winds the shaped strip onto the mandrel with the mandrel at the first, intermediate, diameter to form a core winding; in a second phase the control means causes the adjusting means to expand the mandrel to the second diameter inside the core winding to apply a tensile strain to the coils of the winding, operates the clamping means to hold the coils of the core winding in position, and operates the fixing means to fix the coils relative one to another to form a laminated core; and in a third phase causes the adjusting means to contract the mandrel to the third diameter and operates the discharge means to remove the laminated core from the mandrel.

In the preferred apparatus, a plurality of adjustable mandrels is provided, with each mandrel being movable between a winding station at which a shaped strip is wound onto the mandrel to form a core winding, a sizing and fixing station at which the core winding is clamped and fixed to form a laminated core, and a discharge station at which the laminated core is removed from the mandrel. Most preferably, three adjustable mandrels are provided. The three mandrels are mounted for cyclic movement between the winding station, the sizing and fixing station, and the discharge station. In an advantageous embodiment, the three mandrels are mounted on a turntable which rotates to sequentially present each mandrel to the winding, sizing and discharge stations in turn. It is, however, foreseen that more than three mandrels may be provided. Expansion and contraction of the mandrels may be performed while the mandrels are moving between the winding, sizing and discharge stations, or may be performed while the mandrel is at one of the winding, sizing and discharge stations.

The apparatus may further include a stamping station which receives plain metal strip and stamps it to form a strip blank having a castellated profile along one edge of the strip, ready for winding onto the mandrel. During the winding operation, the plane of the strip is substantially perpendicular to the mandrel axis, and the castellated edge may be arranged to contact the surface of the winding mandrel, to form a wound core with internal grooves to accept electrical coils. Alternatively, the castellated edge may be positioned away from the surface of the mandrel during the winding process, to produce a wound core with external grooves to accept electrical coils.

The stamping station may simultaneously produce two strip blanks, each having a substantially straight edge corresponding to the edge of the original plain metal strip, and a castellated edge stamped from the central region of the strip. The plain metal strip may be cut so that the castellated edges of the two strip blanks are interdigitated with each other as they are formed. Each strip blank may comprise a series of elements of "U" or "T" shape, linked together by relatively narrow bridges of metal.

The stamping station may operate continuously to produce one or two strip blanks, and may deliver the strip blanks to a buffering station. The buffering station receives the continuously produced strip blanks, and intermittently delivers strip blank to the winding station as each core winding is formed, interrupting the supply of strip blank to the winding station at the end of each winding operation. The buffering station may have two or more pulleys round which the strip blank is laced, at least one pulley being movable relative to another in order to increase and decrease the length of the run of strip blank which is accommodated in the buffering station.

In embodiments where a plurality of mandrels are provided, delivery of the strip blank is interrupted while the mandrel bearing the core winding is moved to the sizing station and an empty mandrel brought to the winding station, whereupon winding can begin again. In embodiments where a single mandrel is provided, delivery of the strip blank is interrupted at the end of the winding operation, and begins again once the laminated core has been sized, fixed and removed from the mandrel. The buffering station, in one embodiment, comprises a number of pulleys round which the strip blank is laced, at least one pulley being movable in order to increase and decrease the length of the run of strip blank which is accommodated in the buffering station.

A third aspect of the invention provides a mandrel for winding laminated cores for electrical machines, the mandrel comprising: a tubular main body mounted to a support for rotation about the axis of the tubular main body; an inner cone surrounding the main body and axially movable relative to the main body, the inner cone having a wider end and a narrower end; and a plurality of outer segments, mounted to the main body for radial movement relative to the main body, the outer segments engaging the inner cone such that axial movement of the inner cone relative to the main body causes a corresponding radial movement of the outer segments, to vary the effective diameter of the mandrel.

Preferably, the mandrel has a pressure plate engagable with the wider end of the inner cone, and a control rod attached to the pressure plate and movable axially of the tubular main body so as to move the pressure plate and the inner cone axially relative to the main body; and the control rod is selectively movable by an actuator. The mandrel may further include resilient tension elements mounted between the outer segments and the main body to urge the outer segments radially inwardly towards the main body.

A fourth aspect of the invention provides a method for manufacturing a rotor or stator for an electrical machine, comprising manufacturing a laminated core as described above and mounting electrical coils to the core to form a rotor or stator.

A fifth aspect of the invention provides a method for manufacturing an electrical machine, comprising manufacturing a laminated core as described above, mounting electrical coils to the core to form a rotor or stator, and incorporating the rotor or stator into an electrical machine such as a motor or generator.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 1 schematically illustrates the stamping, buffering, winding, and sizing stages in the process;

In accordance with common practice, the various described features are not drawn to scale but are drawn to emphasize specific features relevant to the exemplary embodiments.

DETAILED DESCRIPTION

The above described conventional techniques are usable only to produce stators of small diameter and small axial extent, since the stresses locked in the stator windings during the coiling process are significant and must be overcome by the clamping and transporting means used to move the core from the winding mandrel to the sizing mandrel, and because of the significant forces required to place the wound coil onto, and remove it from, the sizing mandrel.

The present invention relates to producing cores for electrical machines of substantially larger diameters than have hitherto been possible.

Overview

Figure 1:
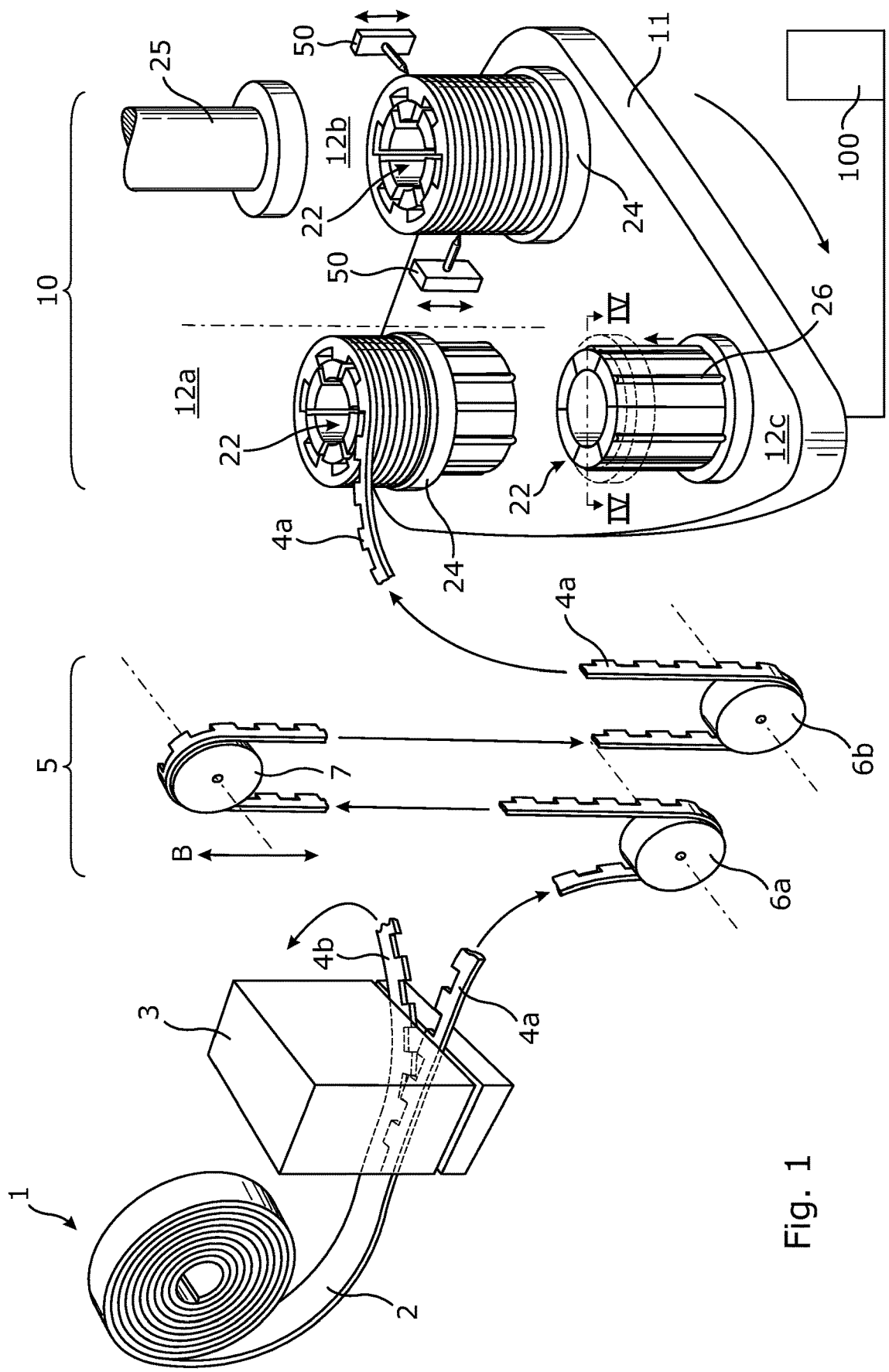

FIG. 1 is a schematic illustration of the method and apparatus for forming a stator core according to the present invention. The process starts at a feed station 1 with a coil of flat strip metal 2. The flat metal strip 2 is fed to a stamping machine 3, which forms the strip 2 into two castellated strips 4a and 4b as the strip is fed stepwise through the stamping machine 3. The stamping machine produces the castellated strips 4a and 4b in a substantially continuous process.

The production of the castellated strips 4a and 4b is continuous, however the winding process for forming the cores is intermittent. A buffering device 5 is thus positioned after the stamping machine 3 to absorb production from the stamping machine at times when the winding process is interrupted.

From the buffering device, the castellated strip is led to the core forming station 10. The core forming station 10 comprises a turntable 11 on which are mounted three variable-diameter mandrels. A first mandrel is positioned at a winding station 12a, and is driven in rotation to wind the castellated strip 4a onto the mandrel to form a helical core winding. The strip is wound with one edge of the strip adjacent to the mandrel, and the plane of the strip substantially perpendicular to the axis of the mandrel, so that the strip is curved in its own plane as it is wound round the mandrel.

Once the core winding is formed by winding the required number of coils round the mandrel, the strip 4a is cut and feeding of the strip at the winding station 12a is stopped. The core winding is then clamped to retain its helical form. The turntable 11 is indexed to move the mandrel to a sizing and fixing station 12b. At this station, the helical core winding is sized by expanding the mandrel to a predetermined diameter. The coils of the core winding are then welded to fix the coils of the core relative one to another.

On completion of the welding operation, the turntable 11 is again indexed to bring the mandrel and the completed core to a discharge station 12c, where the mandrel is contracted to a smaller diameter in order to free the completed core, and the finished laminated core is removed from the mandrel.

In the illustrated embodiment, while the mandrel at the winding station 12a is producing a core winding, the second mandrel at the fixing station 12b will be sizing and fixing a previously-produced core winding, and a completed core will be in the process of being removed from the third mandrel at the discharge station 12c. Each indexing operation thus brings an empty mandrel from the discharge station 12c back to the winding station 12a, so that feeding of the strip 4a can be resumed and the next core winding produced. Likewise, each indexing operation also takes a newly-produced core winding from the winding station 12a to the sizing station 12b, and a finished core from the sizing station 12b to the discharge station 12c.

The operation of the apparatus is controlled by a control system 100.

The Feed Station

At the feed station 1, a coil of flat metal strip 2 is held on a feed device such as a reel or drum, and a free end of the coil is led to the entry end of the stamping machine 3. The feed station 1 preferably accommodates a coil of metal strip 2 of sufficient length to supply the stamping machine for continuous operation over an extended period, possibly a number of hours. The flat metal strip 2 is unwound from the reel or drum and fed into the stamping machine, either by driving the reel or drum in rotation, or by means of a tension in the strip produced by a feed mechanism in the stamping machine.

The Stamping Machine

Figure 2:
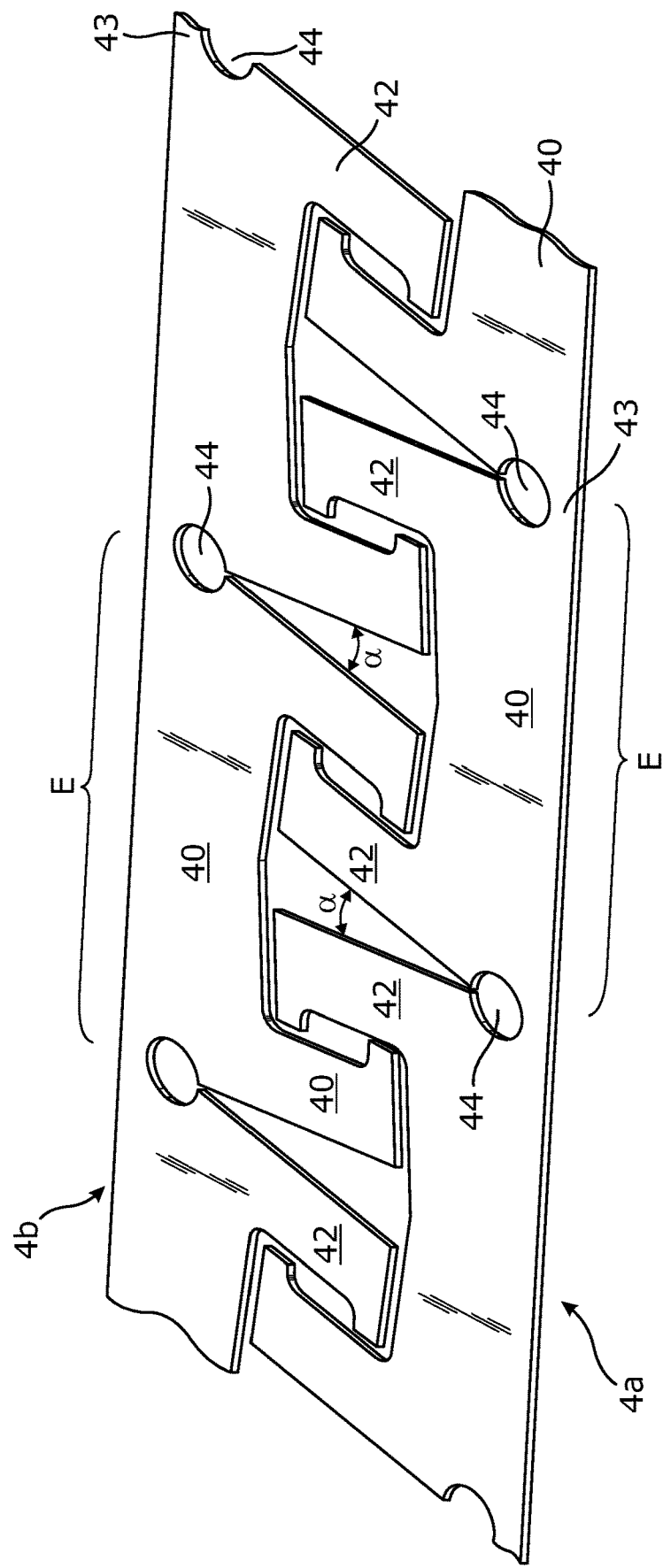
FIG. 2 is a perspective view showing a plain strip divided to produce two interdigitating strip blanks.

The stamping machine 3 is a conventional reciprocating stamping machine which feeds the strip between a pair of dies, and forms the flat metal strip 2 into two interdigitated castellated strips 4a and 4b. FIG. 2 illustrates an example of the strips 4a and 4b produced by the stamping machine 3. In the illustrated example, each castellated strip is essentially formed of a number of "U" shaped elements E joined side-by-side. Each element E has a base part 40 extending along a straight edge 41 of the strip, and a pair of fingers 42 at respective ends of the base part 40 and extending transversely to the base part 40. The elements E are joined by a narrow bridge of material 43 between the straight edge 41 and a circular opening 44 at each end of the base 40.

The stamping process produces the elements E of each castellated strip 4a, 4b in a staggered formation so that respective fingers 42 of two adjacent elements E of one castellated strip 4a are positioned between the two fingers 42 of each element E of the other strip 4b, and vice versa.

The fingers 42 of each element E in the illustrated embodiment, converge in a direction away from the base 40 of the element, so that an angle $\alpha$ is formed between the adjacent edges of each neighboring pair of fingers 42. This angle $\alpha$ allows the castellated strip to be curved to form the annular core by bending the narrow strip 43 so that the edges of adjacent fingers 42 are brought together to form radially inwardly-extending teeth 45 of generally "T" shape, and between each adjacent pair of teeth 45 an axially-extending slot S is formed. The electrical windings of the stator will eventually be accommodated in the slots S. The angle $\alpha$ will of course depend on the number of elements E present in each coil of the helical winding. In the illustrated example stator core seen in FIG. 3, there are 14 elements E in each coil of the core, and thus the angle $\alpha$ in the strip 4a, 4b as originally formed will be about 25.7 degrees. In general, for a core having N elements E in each coil, the angle α in degrees will be 360 divided by N.

The flat strip 2 may be formed into a single element E of each of the two castellated strips 4a, 4b at a single stamping operation, and the strip then advanced by the length of one element E and the operation repeated. Alternatively, the castellated strips may be formed as a result of a number of successive stamping operations as the strip is advanced stepwise through a number of different pairs of dies, in order gradually to form the elements E of each castellated strip 4a, 4b. Those skilled in the art will have no difficulty in devising appropriate stamping dies and feeding apparatus to advance the flat strip 2 and produce the castellated strips 4.

The stamping machine 3 is preferably operated substantially continuously, in order to produce the castellated strips 4a, 4b at a substantially constant rate. The stamping machine 3 may be under the control of the control system 100, to start and stop stamping operations depending on the need for the castellated strips at the core forming station.

In the illustrated embodiment, one of the castellated strips 4a is led to the buffering and core forming stations. Castellated strip 4b may be led to a second set of buffering and core forming stations (not shown) for the simultaneous production of wound cores, or alternatively the strip 4b may be wound onto a reel (not shown) for storage and subsequent supply to a core forming station.

Alternatively, if the strips 4a and 4b are of identical elements, the castellated strip 4b may be twisted through 180 degrees and placed above or below and in registration with the castellated strip 4a, to produce a castellated strip of double thickness. The double strip may then be sent through the buffering device and to the winding station so that both castellated strips may be simultaneously wound onto a mandrel. A core winding of the required axial length will then be produced with only half the number of rotations of the mandrel required to produce a core winding when castellated strip of a single thickness is wound.

The Buffering Device

The strip 4a is produced substantially continuously by the stamping machine 3, but is required only intermittently by the winding station 12a. Preferably, the speeds of operation of the stamping machine 3 and the winding station 12a are arranged such that when a core is being wound onto a mandrel at the winding station 12a, the strip 4a is being wound onto the mandrel faster than it is being produced by the stamping machine 3. Clearly, after the strip 4a has been cut and while the mandrels are indexing round, the strip 4a at the winding station 12a is stationary.

Buffering device 5 comprises two fixed pulleys 6a and 6b, and a moving pulley 7. The castellated strip 4 is led from the stamping machine 3 under the first fixed pulley 6a and then up and over the moving pulley 7, and finally down and under the second fixed pulley 6b before being led to the winding station 12a for winding onto a mandrel. Movement of the pulley 7 in a vertical direction as shown by the arrow B changes the lengths of the runs of castellated strip between the moving and fixed pulleys, thus varying the length of castellated strip held in the buffer.

During winding operations, the moving pulley 7 moves downward towards the fixed pulleys 6a and 6b, in order that the strip 4a can be provided to the winding station 12a at the required rate, by reducing the effective length of the runs of strip between the moving pulley 7 and the fixed pulleys 6a and 6b.

While the turntable 11 and mandrels are indexing round and the cut end of the strip 4a at the winding station 12a is stationary, the moving pulley 7 moves upward away from the fixed pulleys 6a and 6b. This increasing effective length between the moving pulley 7 and the fixed pulleys 6a and 6b absorbs the strip 4a being produced by the stamping machine, until the next winding operation commences at the winding station 12a.

The moving pulley 7 is mounted to a supporting mechanism (not shown) which maintains a predetermined amount of tension in the castellated strip 4a, in order to draw the strip 4a out of the stamping machine 3 and onto the fixed pulley 6a. The buffering device 5 may be under the control of the control system 100, or may be an autonomous device.

Core Forming Station

The core forming station 10 comprises a turntable 11 rotatable about a central axis 21. The turntable has mounted to it in this embodiment three identical mandrels 22 which are rotatable relative to the turntable 11 about axes parallel to the central axis 21, and are also variable in diameter. In the illustrated embodiment, the external surface of each mandrel 22 is formed by six segments 23, which are mounted for radial movement relative to the mandrel's rotation axis in order to vary the effective diameter of the mandrel.

Surrounding each mandrel is a clamping and lifting ring 24, which is movable axially of the mandrel to engage one end of the core winding formed when the castellated strip 4a is wound onto the mandrel.

The three mandrels 22 are respectively positioned at a winding station 12a, a sizing and fixing station 12b, and a discharge station 12c. The mandrels 22 are mounted to the turntable 11 so that an indexed rotation of 120 degrees of the turntable 11 will move each mandrel to the next station in the sequence.

Winding Station

At the winding station 12a, the mandrel 22 is adjusted so that its external diameter is set to a predetermined dimension D1, depending on the nominal diameter of the core being produced. Typically, D1 is up to about 5% smaller than the nominal internal diameter of the finished core. D1 may, in some embodiments, be from 3 to 5 millimetres less than the nominal internal diameter of the finished core. The mechanism of the mandrel by which the diameter is adjusted will be explained below, with reference to FIG. 5.

The castellated strip 4a is positioned against the free end of the mandrel, with its plane substantially perpendicular to the axis of the mandrel. The lifting ring 24 is raised to engage one face of the strip from below, while a plunger 25 is lowered to engage the other face of the strip from above, and pressure is applied to clamp the strip between the lifting ring 24 and the plunger 25. Guides and/or rollers (not shown) position the castellated edge of the strip 4a against the outer surfaces of the segments 23 of the mandrel, and rotation of the mandrel draws the strip onto the mandrel to form a helical core winding.

During winding, the strip is clamped between the plunger 25 and the lifting ring 24. The plunger 25 and the lifting ring 24 may be rotated with the mandrel 22 as the core winding is formed. As winding of the core proceeds, the lifting ring 24 is moved axially down the mandrel 22 to accommodate the newly-formed coils of the core winding, while maintaining the required clamping force between the plunger 25 and the lifting ring 24 to preserve the form of the winding.

Figure 3:
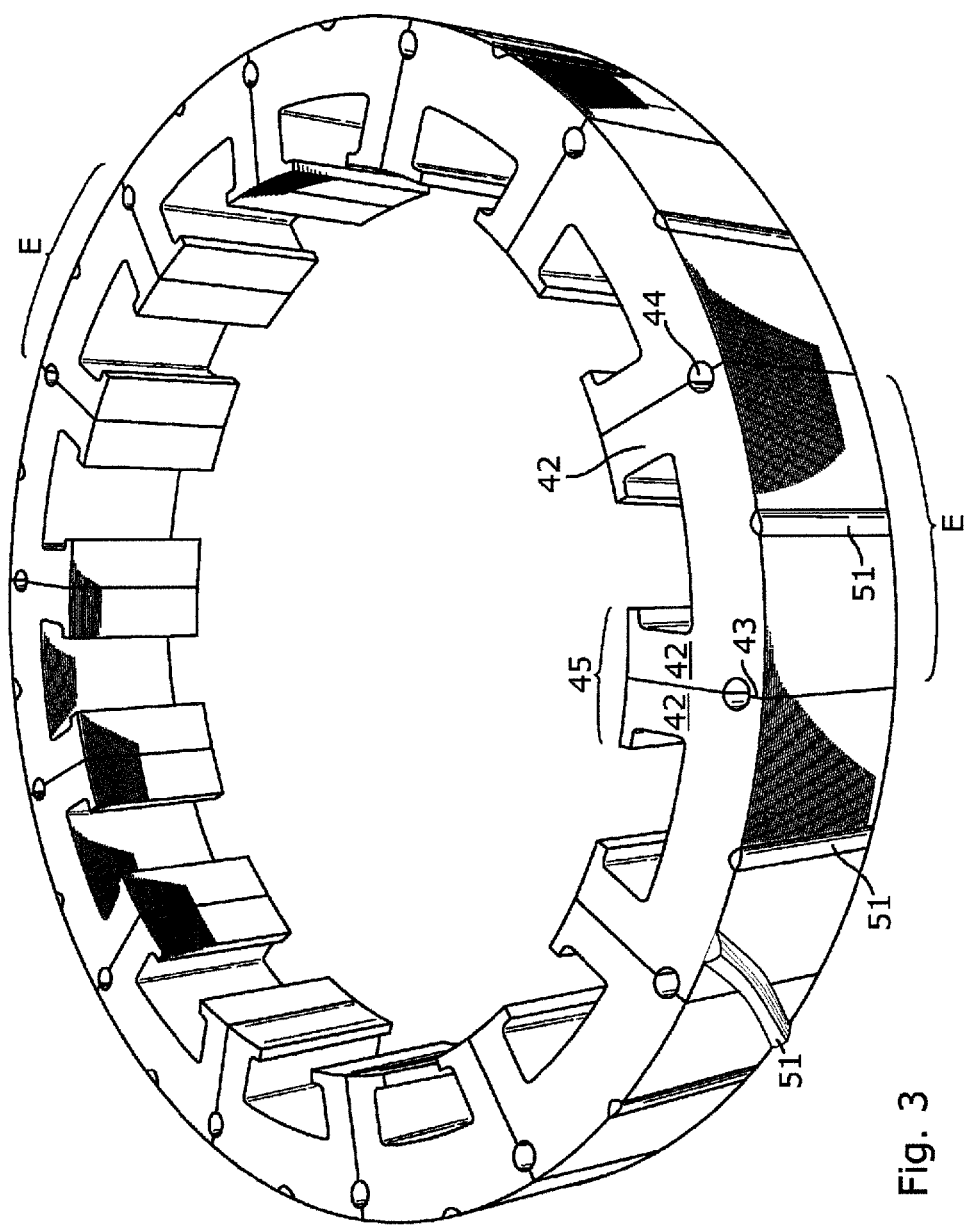
FIG. 3 is a perspective view of the laminated core.

Each segment 23 of the mandrel has an external axial rib 26 which, during winding, engages a finger 42 of each coil of the castellated strip 4a in order to prevent slipping of the strip relative to the mandrel, and to preserve alignment between the fingers 42 of adjacent coils of the core winding. The axial rib 26 of each segment 23 may extend parallel to the rotation axis of the mandrel 22, in which case a core winding is produced in which the fingers 42 of each coil of the core winding are circumferentially aligned with the fingers 42 of adjacent coils, and a wound core with axially extending internal slots S is produced (as illustrated in FIG. 3). Alternatively, the axial ribs 26 of the segments 23 may be inclined to the axis of the mandrel, so that a core winding is produced in which the fingers 42 of each coil of the winding are slightly circumferentially offset from the fingers 42 of adjacent coils of the winding, in order to produce a wound core having helical internal slots S to accept the electrical windings of the machine in which it is to be used.

When sufficient turns of the mandrel have been completed to produce a core winding of the required axial length, the castellated strip 4a is cut and feeding of the strip onto the mandrel is stopped. The completed core winding is held on the mandrel by the clamping pressure exerted between the lifting ring 24 and the plunger 25. Maintaining this clamping pressure, the turntable 11 is then indexed to move the mandrel 22 from the winding station 12a to the sizing and fixing station 12b.

Sizing And Fixing Station

Figure 4C:
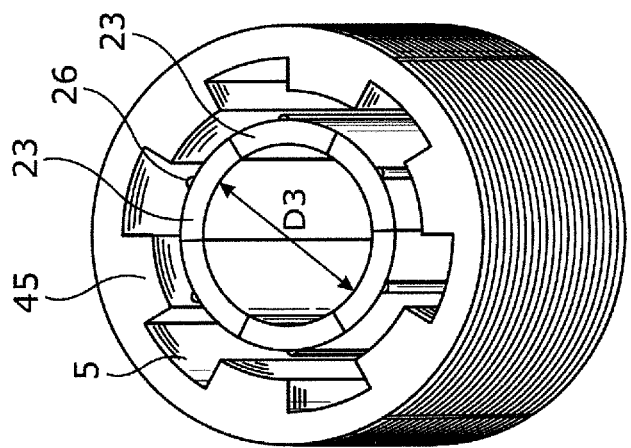
FIGS. 4A to 4C are respectively schematic perspective views showing the different diameters of the mandrel corresponding to the winding, sizing and discharge operations.
Figure 4B:
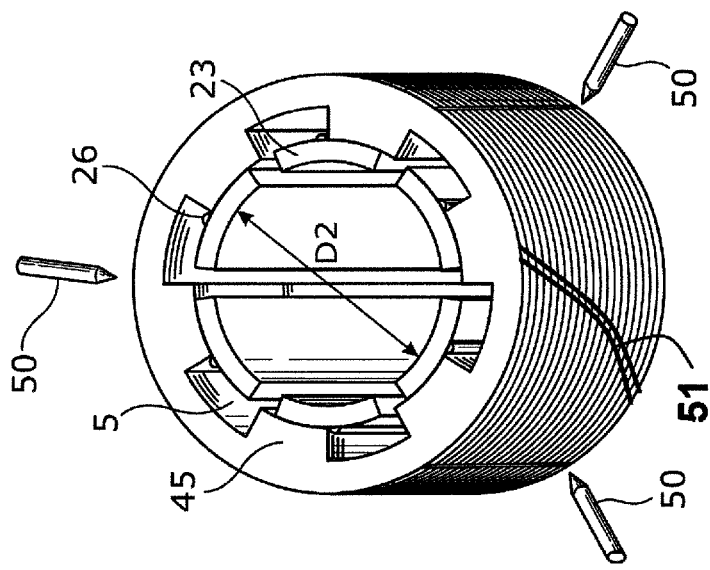
Figure 4A:
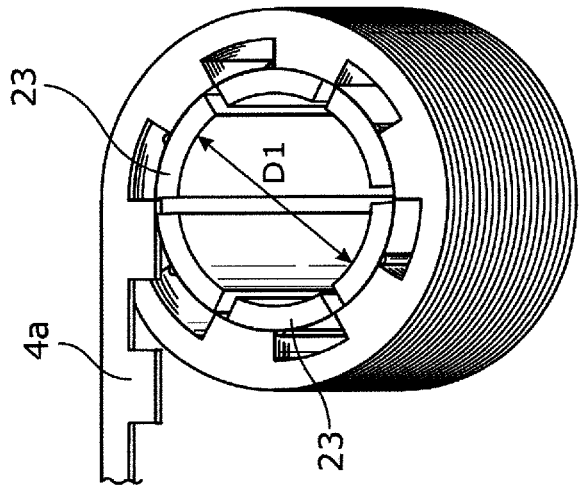

At the sizing and fixing station 12b, the mandrel 22 is adjusted so that its external diameter is set to a predetermined dimension D2, as seen in FIG. 4B. The diameter D2 again depends on the diameter of the core being produced and the material properties of the wound strip. Typically, D2 is up to 5% larger than the nominal internal diameter of the finished core. D2 may, in some embodiments, be from 3 to 5 millimetres more than the nominal internal diameter of the finished core. This expansion of the mandrel applies a small tensile strain to the wound strip, and increases the tensile stress in the wound strip 4a, and the small movement of the mandrel ensures that the fingers 42 are firmly held against their respective ribs 26 to align the coils of the core winding. The mandrel may be expanded and contracted a number of times between the diameters D1 and D2, finishing with an expansion to the predetermined diameter D2, in order to settle the coils of the core winding relative one to another in order to produce a uniformly wound core winding held at the required diameter D2.

Maintaining the clamping pressure between the plunger 25 and the lifting ring 24, welding heads 50 are then moved into engagement with the outer surface of the core winding, and longitudinally-extending welds are effected along the outer surface of the core winding in order to fix the coils of the core winding relative one to another. The welds may be made by a single welding operation, in which a plurality of welding heads 50 each produce a weld line 51. In the illustrated embodiment of FIG. 1, two welding heads 50 are shown. In the schematic arrangement illustrated in FIG. 4B, three welding heads are shown. It is foreseen that a larger number of welding heads may be provided, to produce a corresponding larger number of weld lines, particularly when cores of extremely large diameter are being formed. Alternatively, a small number of welding heads, or a single welding head 50 may be provided, and be operated to produce small number of weld lines 51 or a single weld line 51, the mandrel 22 then being rotated by a predetermined angle and the welding head or heads operated again to each produce a second weld line. This operation may then be repeated a number of times until the required number of weld lines have been produced, and the coils of the core winding are fixed relative one to another, producing the laminated core.

Preferably, as seen in FIG. 3, each element E of each coil of the stator core is joined to its neighbours in adjacent coils by a weld line 51, and to its neighbors in the same coil by the bridge sections 43 at the ends of its base 40.

Once the weld lines 51 have been produced, the plunger 25 and/or the lifting ring 24 may be retracted to release the clamping force on the stator core. The turntable 11 is then indexed to move the mandrel 22 from the sizing and fixing station 12b to the discharge station 12c.

Discharge Station

At the discharge station 12c, the mandrel 22 is contracted to a reduced diameter D3, releasing the engagement between the mandrel and the stator core, as seen in FIG. 4C. As the mandrel 22 is contracted, the laminated core "relaxes" as tensile forces in the coils of the core are released, and the diameter of the finished stator core shrinks to the required nominal diameter.

The reduced diameter D3 preferably provides a radial clearance between the ribs 26 of the segments 23 and the radially inner ends of the teeth 45 of the finished stator core. This allows the lifting ring 24 to be moved toward the free end of the mandrel 22 (upwardly as seen in FIG. 1) in order to move the finished stator core off the mandrel 22. The stator core may then be gripped by a transporting device (not shown) and moved away from the mandrel 22. The radial clearance between the ribs 26 and the ends of the teeth 45 allows the finished stator core simply to be lifted off the mandrel without any rotation, even if the ribs 26 are of helical form and the stator core is formed with helical teeth 45 and slots S.

Preferably, the control system 100 controls the operation of the core forming station 10, by timing the driving of the mandrels, the rotation of the turntable, the expansion and contraction of the mandrels and the operation of the welding heads, the clamping device and lifting ring to perform the winding fixing and discharge operations.

The Mandrel

Figure 5A:
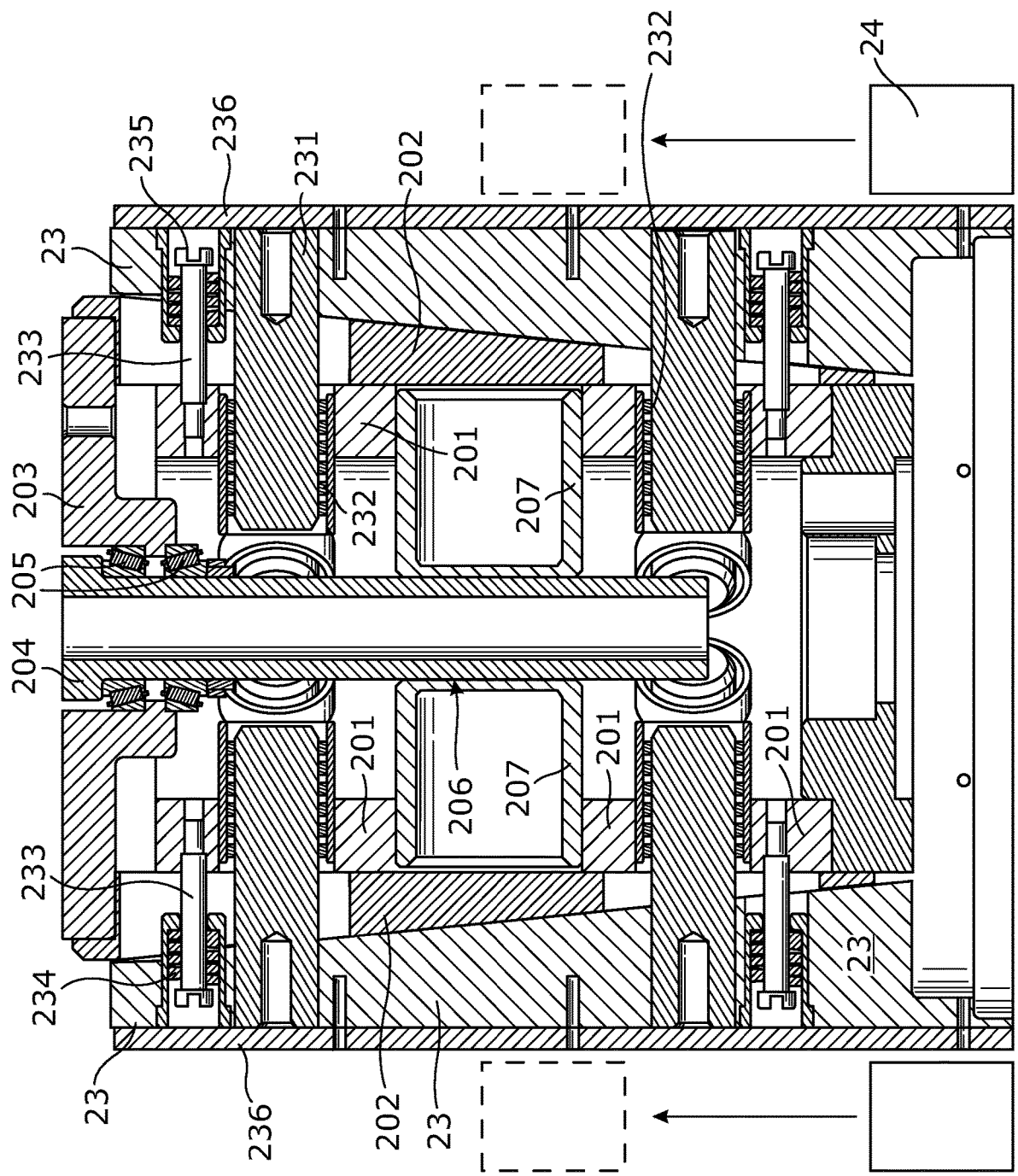
FIG. 5A is a cross-sectional view of the mandrel in its intermediate diameter position, for winding the strip to form the core winding.
Figure 5B:
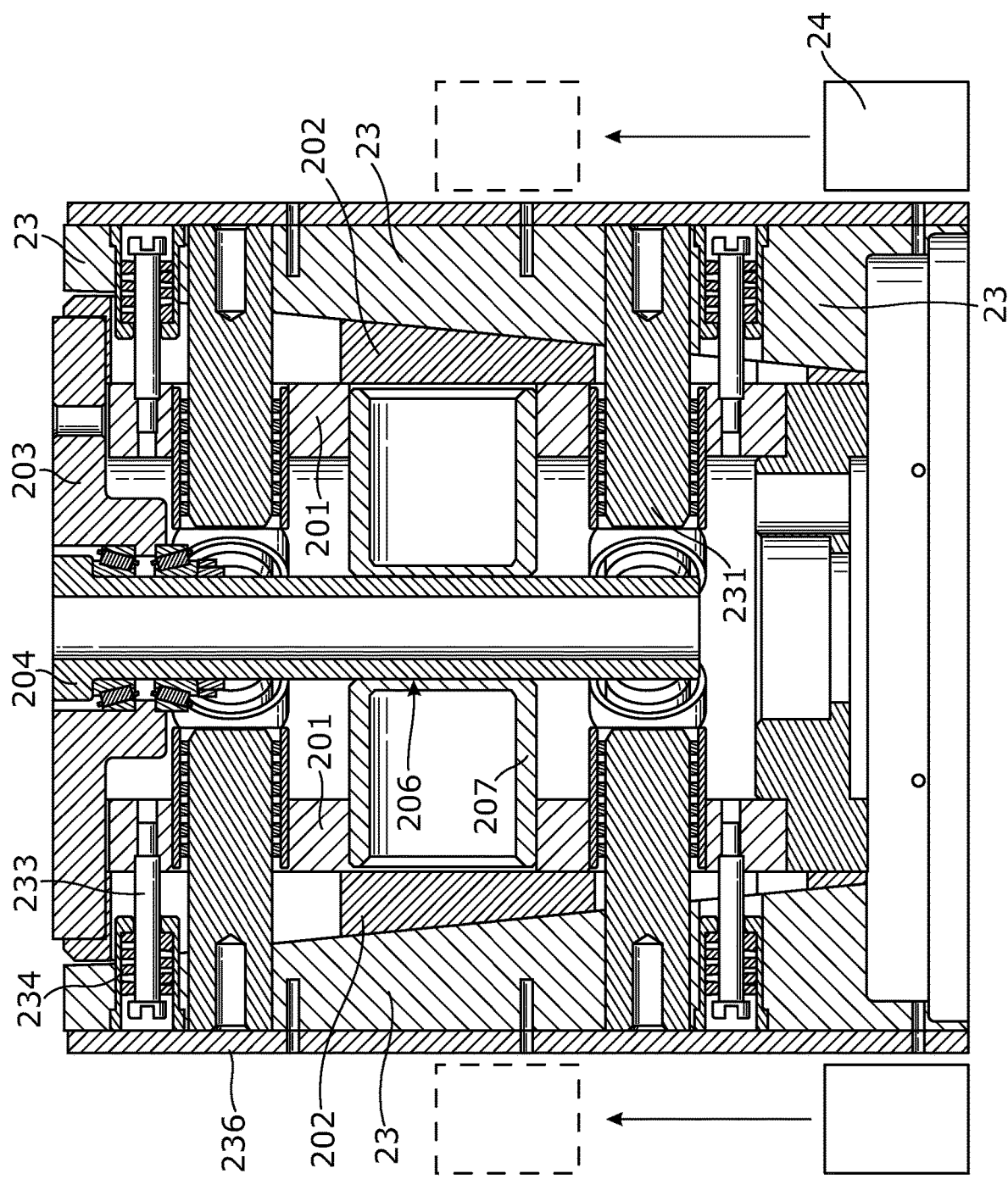
FIG. 5B is a cross-sectional view of the mandrel in its increased diameter position, for sizing and fixing the laminated core.
Figure 5C:
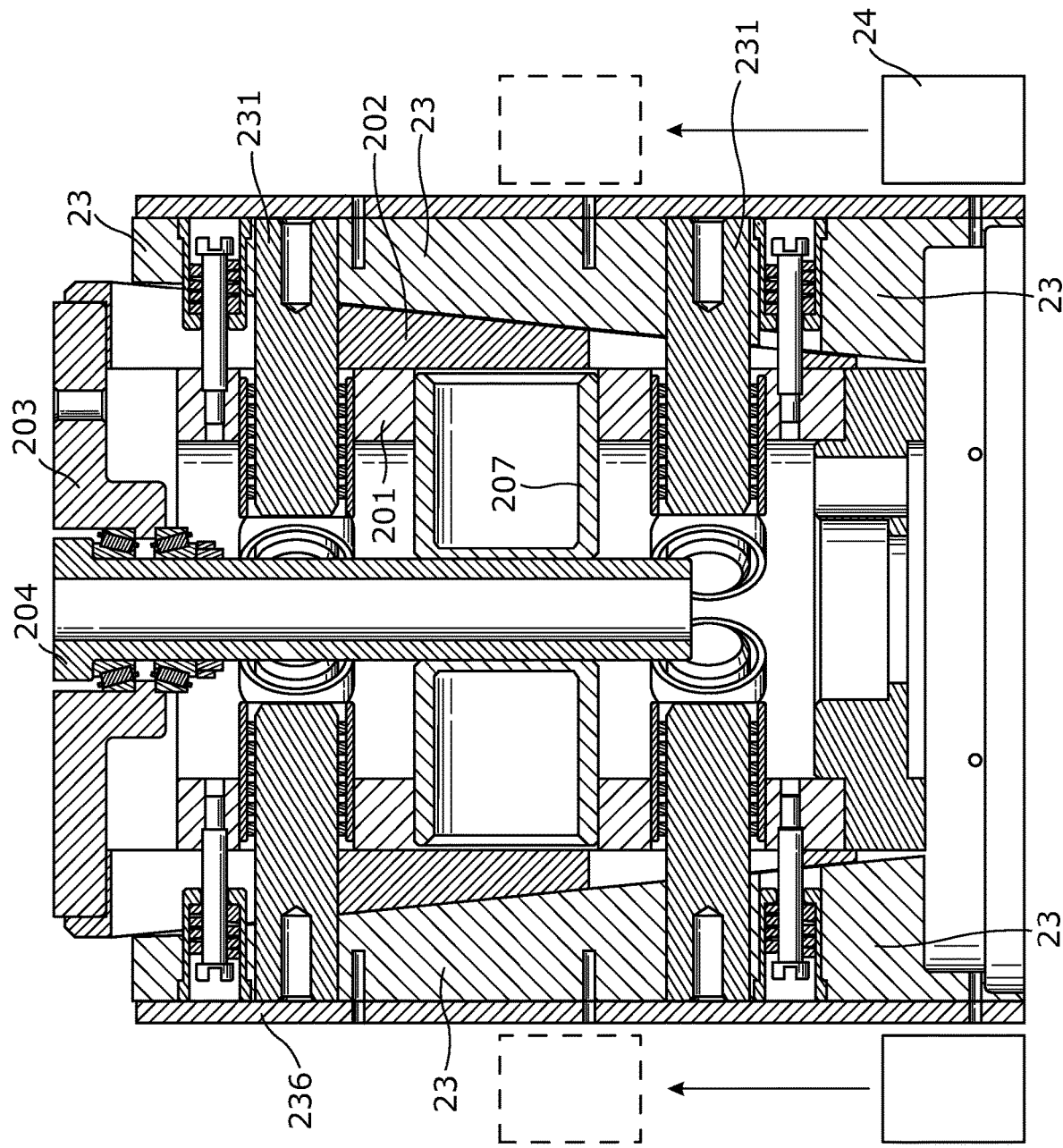
FIG. 5C is a cross-sectional view of the mandrel in its reduced diameter position, for discharging the laminated core.

FIGS. 5A, 5B and 5C show, in diametral section, the internal structure of an embodiment of the mandrel 22, respectively in the winding, fixing and discharge positions.

Referring now to these Figures, the mandrel 22 comprises a base 200 which is rotatably mountable to the turntable 11, and supports a tubular main body 201. An inner cone 202 is axially slidable on the main body 201, the inner cone having at its upper end a pressure plate 203 which is rotatably mounted to a control rod 204 by two pairs of conical bearings 205 which prevent the pressure plate 203 from moving axially relative to the control rod 204. In the illustrated embodiment, the outer surface of the inner cone 202 tapers downwardly, i.e. the external diameter of the inner cone 202 is greater at its upper end (as seen in the Figure). The control rod 204 is mounted coaxially with the main body 201 by passing through a central bore 206 in a transversely extending beam 207. The axial position of the inner cone 202 relative to the main body 201 is controlled by the control rod 204 which moves the pressure plate 203, and thus the inner cone 202, relative to the main body 201.

The control rod 204 may be moved by an actuator (not shown) mounted in the turntable 11, and engaging the control rod 204 for example by an internal thread on the control rod 204. The actuator may rotate a threaded rod engaged in an internal thread in the control rod 204, while the control rod 204 is held against rotation, in order to impart axial movement to the control rod 204. The axial position of the control rod 204 may then the determined by counting rotations of the threaded rod from a known starting position. Alternatively, the control rod 204 may simply be moved by a hydraulic or other linear actuator which axially pushes or pulls the control rod 24 to the required axial position relative to the main body 201 of the mandrel. The shallow tapering angle of the inner cone 202 and the corresponding tapering surfaces of the segments 23 allows the diameter of the mandrel to be accurately controlled by the axial positioning of the inner cone 202. For example, an axial movement of 10 millimeters of the inner cone 202 may produce a change in the external diameter of the mandrel of 1 millimeter or less.

The outer segments 23 are upwardly tapered, at the same angle as the inner cone 202, and engage the outer surface of the inner cone 202. The segments 23 are mounted for radial movement relative to the inner core 201 by means of support bars 231 mounted to the main body 201 in ball bearings 232. The support bars 231 pass through elongate clearance openings in the inner cone 202. The segments 23 are resiliently urged towards the main body 201 by means of tension screws 233 secured in the main body 201 and spring washers 234 mounted in recesses 235 in the segments 23.

The outer faces of the segments 23 have attached to them faceplates 236 on which the ribs 26 (not shown in FIG. 5) are mounted. This allows the nominal external diameter of the mandrel to be selected, by selecting and mounting a set of faceplates of the required thickness, without disturbing the expansion and contraction mechanism. Furthermore, the mandrel may be converted from axial to helical ribs 26 without major disassembly of the mandrel simply by replacing the faceplates 236. Faceplates 236 with differently shaped ribs 26 may be mounted to the segments 23 in dependence on the exact form of the stator core being produced. Alternatively, the faceplates 236 may be omitted, and the ribs 26 may be formed directly on the outer surfaces of the segments 23. With this alternative, however, conversion from one type of stator production to another may require replacement of the segments 23 of the mandrel.

To vary the diameter of the mandrel, the control rod 204 is moved axially relative to the main body 201 and moves the inner cone 202 axially on the main body 201. Segments 23 are prevented from moving axially of the mandrel by the support bars 231, and are drawn radially inwards by the resilient elements 234 to maintain contact between the tapering inner faces of the segments 23 and the inner cone 202. Thus, upward movement of the inner cone 202 (as seen in FIGS. 5A, 5B and 5C) causes the segments 23 to move radially inwards by the action of resilient elements 234, reducing the diameter of the mandrel. Likewise, when the inner cone 202 is moved downward, the wedging action of the inner cone, between the outer surface of the main body 201 and the tapered inner surfaces of the segments 23, causes the segments 23 to move radially outwards against the resilient force of the elements 234, increasing the diameter of the mandrel.

The axial position of the inner cone 202 relative to the main body 201 thus determines the effective diameter of the mandrel 22. The control means 100 may determine the required effective diameter of the mandrel, and receive an input from a sensor to detect the position of the inner cone 202 relative to the main body 201. The control means 100 may then determine the required position of the inner cone 202 to provide the required effective diameter, and control an actuator or drive means for moving the inner cone 202 relative to the main body 201 to that required position. The control means may receive a command defining the required effective diameter for the mandrel, and compare this with an output from the sensor to determine the direction and amount of movement of the inner cone 202 which will bring the mandrel to the required effective diameter. The control means may then operate the actuator to produce the movement of the cone 202, bringing the mandrel to the required effective diameter. As an alternative to measuring the position of the inner cone 202, a sensor may directly measure the effective diameter of the mandrel by measuring the distance between the main body 201 and the segments 23, and determine the required movement of the inner cone on the basis of this measurement.

FIG. 5A shows the mandrel in an intermediate-diameter position, such as would be used at the winding station 12a. FIG. 5B shows the inner cone 202 moved downwardly, which in turn moves the segments 23 outwards and increases the diameter of the mandrel. This position is appropriate for the mandrel in the sizing and fixing station 12b. FIG. 5C shows the inner cone 202 raised to its uppermost position, corresponding to a minimum diameter of the mandrel 22 appropriate for the discharge station 12c.

Figure 6:
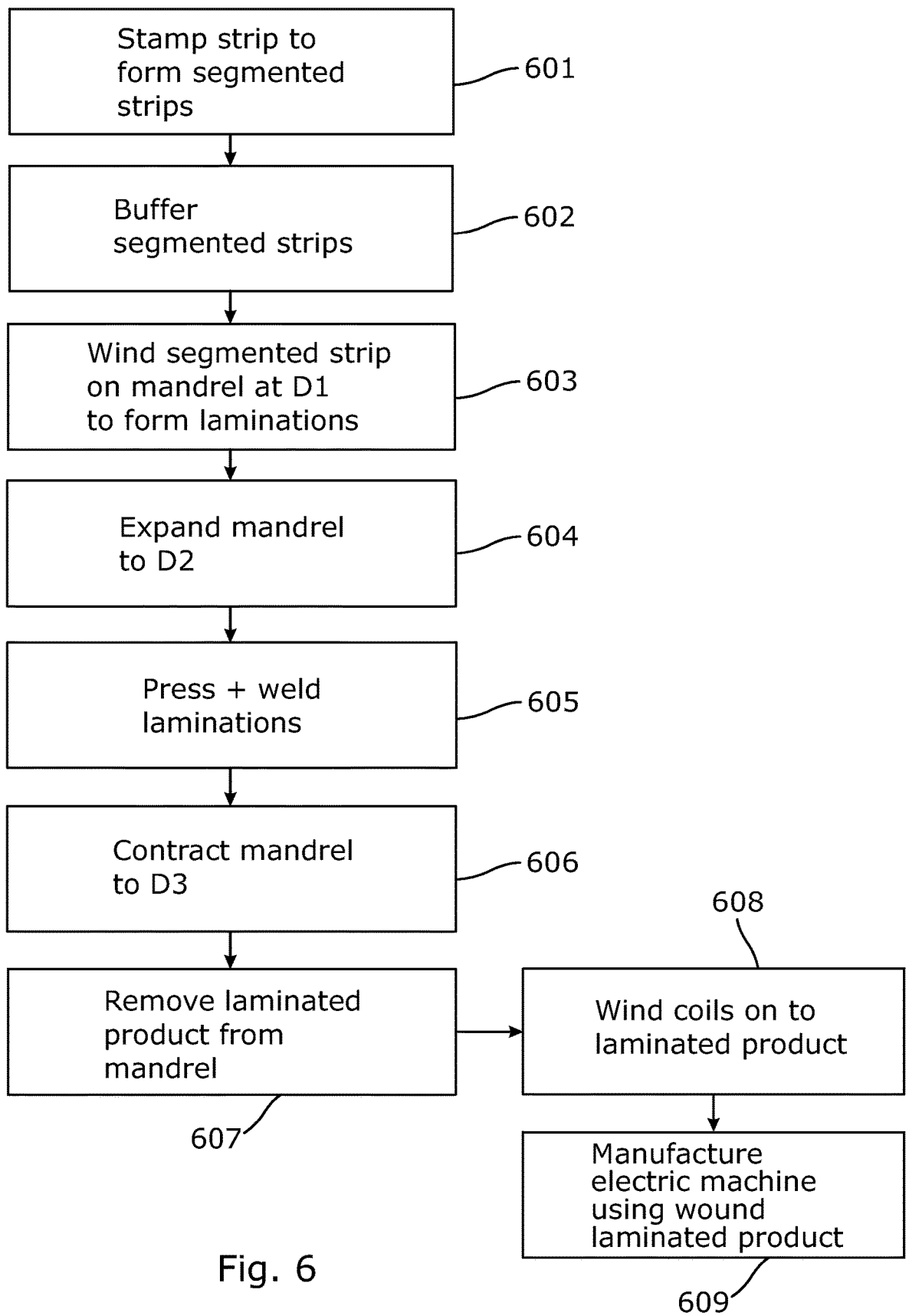
FIG. 6 is a flowchart setting out the process steps in the production of a laminated core and an electrical machine incorporating the core.

The steps of the method are summarized in the flowchart of FIG. 6. In step 601 the flat metal strip to is stamped in the damping device 3 to form the segmented strips 4a and 4b. The segmented strip 4a or strips are then sent to respective buffers 5, from where the segmented strip is sent to the winding station 12a to be wound onto the mandrel 22 in step 603.

When winding is completed, the mandrel 22 is then moved from the winding station 12a to the fixing station 12b, and the mandrel diameter is expanded at step 604. While the core winding is held at the fixing station 12b, the turns of the core winding are fixed by welding in step 605.

The mandrel 22 is then moved from the fixing station to the discharge station 12c, and the mandrel is contracted to the smaller diameter in step 606. In step 607, the finished laminated core is removed from the mandrel.

The operations described in steps 601 to 607 may be controlled by the control system 100, which may include a processor, memory to store a control program, and the necessary actuators and apparatus operable under control of the processor to effect adjustment of the mandrel diameter, winding and clamping of the strip onto the mandrel, rotation of the turntable 11, operation of the welding heads 50, and operation of the lifting ring 26 to discharge the laminated core.

In order to produce an electric machine incorporating the laminated core, the finished laminated core is provided with electrical coils at step 608, and in step 609 the laminated core and electrical coils are incorporated into an electrical machine such as a generator or an electric motor.

Modifications And Alternatives

Although the mandrels described above are formed using six segments 23, it is foreseen that different numbers of segments may be used. For example a small-diameter mandrel for winding stators of nominal diameters up to about 250 mm may have from 3 to 10 segments, and large-diameter mandrels may have up to 20 or more segments. The mandrel preferably has at least four, and most preferably six or more, segments in order that expansion and contraction of the diameter of the mandrel should not disadvantageously affect the "roundness" of the finished stator core.

Each segment preferably has a single registration rib 26, but it is foreseen that segments may have more than one rib. Where a single registration rib 26 is provided, it is preferably positioned in radial alignment with the radial movement direction of its segment 23.

The inner cone 202 of the mandrel in the illustrated embodiments has its larger end adjacent the free end of the mandrel, so that movement of the inner cone toward the fixed and of the mandrel (i.e. downwards as seen in FIG. 5) increases the diameter of the mandrel by urging the segments 23 apart. It is foreseen that the inner cone may be mounted with its larger end adjacent the fixed end of the mandrel, and the segments 23 tapered correspondingly, so that movement of the inner cone toward the free end of the mandrel causes the segments to move apart and increase the effective diameter of the mandrel.

At the winding station 12*a*, the core winding is produced in the embodiment described above by feeding the castellated strip 4*a* onto the mandrel 22 at the free end of the mandrel. It is foreseen that the strip may alternatively be fed onto the mandrel at the end of the mandrel adjacent the turntable 11. With such an arrangement, the plunger 25 will be fitted over the mandrel in order to maintain pressure on the core winding while it is being formed, against the counter pressure of the lifting ring 24, and will move along the mandrel as the coils are wound and the axial length of the core winding increases.

In the described embodiment, the turntable 11 is generally positioned in a horizontal plane, with the axes of the three mandrels 22 and the rotation axis of the turntable generally vertical. It is foreseen that the apparatus may be constructed with the turntable 11 mounted in a vertical plane for rotation about a horizontal axis, or may be mounted in any other plane. The turntable 11 may even be mounted in an inverted orientation as compared to that seen in FIG. 1, with the mandrels 22 extending downwardly from the turntable. This may be advantageous in that at the discharge station contraction of the mandrel diameter will simply allow the finished stator core to fall axially off the mandrel, for example on to a conveyor or other handling apparatus.

In a further alternative, the axes of the mandrels 22 and the central axis 21 of the turntable may not be parallel, but may be convergent. In such an arrangement, rotation of the turntable about its axis may present a mandrel 22 at a winding station with the axis of the mandrel in a horizontal plane, while a mandrel 22 at the discharge station has its axis extending downwardly for easy discharge of the finished laminated core.

To vary the diameter of the mandrel, the segments 23 may be individually driven in the radial direction of the mandrel by discreet actuators operating between the segment 23 and the main body 201 of the mandrel. The actuators may be controlled to move the segments 23 in unison relative to the main body 201. For example, each segment may be fixed to a threaded rod extending radially of the mandrel and engaging a threaded nut rotatably mounted in the main body 201, so that rotation of the nut will cause radial movement of the threaded rod and its segment 23. Rotation of the threaded nuts may be synchronized, either by controlling motors causing their rotation, or by a mechanism gearing together the rotations of the nuts. Other types of actuator may be used, either individually controlled or linked together by an operating mechanism, to move the segments 23 relative to the main body 201 of the mandrel 22.

As an alternative to a mandrel having a continuously variable diameter, for example in cases where large volume production of a particular size and type of stator core is foreseen, then the mandrel may simply have three alternative positions corresponding to the winding diameter D1, the fixing diameter D2, and a reduced diameter D3 for discharging the finished laminated core. These three diameters will be predetermined based on the nominal dimensions of the laminated core and the material properties of the strip used to form the core.

In the embodiment illustrated in FIG. 1, the castellated metal strip 4*a* is fed to the buffer 5 and then to the winding station 12*a*. In an alternative arrangement, pre-formed castellated strip 4*a*, 4*b* may be stored on a reel or drum, and may be delivered directly and intermittently to the winding station 12*a*.

In the embodiments described above, the winding, fixing and discharge operations are carried out at separate stations 12*a*, 12*b* and 12*c*. It is however foreseen that the core forming station 10 may comprise only a single mandrel 22 which sequentially performs the winding, fixing and discharge operations at a single location.

In an alternative embodiment, the core forming station 10 may comprise 2 mandrels 22 movable between a winding station and a fixing station, so that when one mandrel is winding a core at the winding station, the other mandrel is positioned at the fixing station for fixing the wound core, and the finished core is removed from the mandrel at the fixing station.

Likewise, the core forming station 10 may have three or more mandrels 22 which each sequentially perform the winding, fixing and discharge operations at distinct locations. For example, the core forming station 10 may have a turntable 11 provided with six mandrels 22, so that two of the mandrels may simultaneously be winding cores, while another two of the mandrels may be fixing the core windings, and the last two of the mandrels may be discharging the finished laminated cores. In this example, the six mandrels may be equally spaced around the circumference of the table, and each winding, fixing and discharge station may be diametrically opposite the other winding, fixing and discharge station, respectively. Such an arrangement, if provided with a respective buffering station 5 for each of the castellated strips 4*a* and 4*b*, could simultaneously produce laminated cores from the two castellated strips 4*a* and 4*b* formed at the stamping station 3 from the flat metal strip 2.

In the above description, the castellated strips 4*a* and 4*b* are wound with the smooth edge of the strip radially outward, so that the laminated cores formed at the core forming station 10 have internal slots S and teeth 45, so that electrical coils may be laid internally of the core to form a stator. It is, however, foreseen that the castellated strips 4*a* and 4*b* may be wound onto the mandrel 22 with the base 40 of each element adjacent to the mandrel, and the fingers 42 extending radially outwardly. The laminated core so formed would then have external slots S and teeth 45, to accommodate electrical coils suitable for a rotor of an electrical machine. In such an example, the elements E of the castellated strips may be in the form of an inverted "T" shape, with each element having a single finger 42 positioned centrally of the base 40. Openings 44 may be formed at each end of the base of each element, and notches may be formed to extend from each opening 44 to the edge of the strip remote from the finger 42 so as to enable adjacent elements to curve round the mandrel during winding. The notches may have opposing edges which converge towards the opening 44 at an angle α dependent on the number of segments forming each winding of the core, as explained above in relation to the angle α between the fingers 42. At the fixing station, weld lines 51 may be applied along the bases of the slots S formed on the outer face of the core in order to fix the coils of the core relative one to another.

Although specific embodiments have been illustrated and described herein, it will be appreciated by those of ordinary skill in the art that any arrangement, which can achieve the same purpose, may be substituted for the specific embodiments shown. Therefore, it is manifestly intended that this invention be limited only by the claims and the equivalents thereof.

What is claimed is:

1. A method for manufacturing a laminated core for an electric machine, comprising:
   winding a shaped strip onto a mandrel to form a helical winding having an axis, wherein the plane of the strip is substantially perpendicular to the axis of the helical winding;
   increasing the diameter of the mandrel by a first predetermined amount, while the mandrel is inside the helical winding, to impose a tensile strain on the turns of the helical winding;
   wherein increasing the diameter of the mandrel comprises expanding and contracting the mandrel a plurality of times;
   securing each turn of the strained helical winding relative to its adjacent turn or turns to form the laminated core;
   reducing the diameter of the mandrel by a second predetermined amount greater than the first predetermined amount to relax the laminated core; and
   removing the laminated core from the mandrel.

2. A method according to claim 1, wherein the laminated core has a predetermined nominal internal diameter, and wherein:
   the winding is performed with the diameter of the mandrel smaller than the nominal internal diameter of the laminated core by up to 5%; and
   the securing is performed with the diameter of the mandrel larger than the nominal internal diameter of the laminated core by up to 5%.

3. A method according to claim 1, wherein the mandrel is mounted for movement between a winding station, a sizing station, and a discharge station, and wherein the winding is performed at the winding station, the securing of the turns is performed at the sizing station, and removing the laminated core from the mandrel is performed at the discharge station.

4. A method according to claim 3, wherein increasing the diameter of the mandrel is performed while the mandrel is moving from the winding station to the sizing station, and reducing the diameter of the mandrel is performed while the mandrel is moving from the sizing station to the discharge station.

5. A method according to claim 3, wherein increasing the diameter of the mandrel is performed while the mandrel is at the sizing station, and t reducing the diameter of the mandrel is performed while the mandrel is at the discharge station.

6. A method according to claim 1, wherein the turns of the helical winding are secured relative one to another by weld lines extending along the outer surface of the helical winding.

7. A method according to claim 6, wherein at least three weld lines are formed.

8. A method according to claim 6, wherein the weld lines extend along the length of the helical winding in straight lines parallel to the axis of the helical winding.

9. A method according to claim 6, wherein the weld lines extend in helical lines.

10. A method according to claim 1, wherein the shaped strip has one generally straight edge and one castellated edge, and the castellated edge of the shaped strip is in contact with the mandrel during the winding and securing.

11. A method according to claim 1, wherein the shaped strip has one generally straight edge and one castellated edge, and the generally straight edge of the shaped strip is in contact with the mandrel during the winding and securing.

12. A method of manufacturing a rotor or stator for an electrical machine, comprising:
    manufacturing a laminated core using a method of any of claims 1 to 11; and
    providing electrical coils to the laminated core.

13. A method of manufacturing an electrical machine, comprising:
    manufacturing a laminated core using a method of any of claims 1 to 11;
    providing electrical coils to the laminated core; and
    incorporating the laminated core and electrical coils into an electrical machine.

* * * * *